(12) United States Patent
Chai et al.

(10) Patent No.: US 9,904,088 B2
(45) Date of Patent: Feb. 27, 2018

(54) TOUCH PANEL AND METHOD FOR MANUFACTURING THE SAME

(75) Inventors: Kyoung Hoon Chai, Seoul (KR); Byung Soo Kim, Seoul (KR); Keun Sik Lee, Seoul (KR); Sun Hwa Lee, Seoul (KR); Chung Won Seo, Seoul (KR); Hyuk Jin Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 326 days.

(21) Appl. No.: 13/980,792

(22) PCT Filed: Jan. 18, 2012

(86) PCT No.: PCT/KR2012/000439
§ 371 (c)(1),
(2), (4) Date: Oct. 7, 2013

(87) PCT Pub. No.: WO2012/099394
PCT Pub. Date: Jul. 26, 2012

(65) Prior Publication Data
US 2014/0022467 A1    Jan. 23, 2014

(30) Foreign Application Priority Data

Jan. 19, 2011  (KR) .................. 10-2011-0005611
Jan. 19, 2011  (KR) .................. 10-2011-0005612

(51) Int. Cl.
G06F 3/041   (2006.01)
G02F 1/1333  (2006.01)
G06F 3/044   (2006.01)

(52) U.S. Cl.
CPC .......... *G02F 1/13338* (2013.01); *G06F 3/044* (2013.01); *G06F 2203/04111* (2013.01); *G06F 2203/04112* (2013.01)

(58) Field of Classification Search
CPC .......... G06F 3/044; G06F 2203/04103; G06F 2203/04113; G02F 1/13338
(Continued)

(56) References Cited

U.S. PATENT DOCUMENTS

2007/0236618 A1* 10/2007 Maag et al. .............. 349/12
2008/0158183 A1*  7/2008 Hotelling ............ G06F 3/0416
                                                             345/173
(Continued)

FOREIGN PATENT DOCUMENTS

CN   101349960 A   1/2009
CN   101441538 A   5/2009
(Continued)

OTHER PUBLICATIONS

International Search Report in International Application No. PCT/KR2012/000439, filed Jan. 18, 2012.
(Continued)

*Primary Examiner* — Michael Pervan
*Assistant Examiner* — Andrew Lee
(74) *Attorney, Agent, or Firm* — Saliwanchik, Lloyd & Eisenschenk

(57) ABSTRACT

Disclosed are a touch panel and a method for manufacturing the same. The touch panel according to one embodiment includes the touch panel including a substrate, a first transparent electrode including a first sensor part formed on the substrate in a first direction and a first electrode connection part for electric connection of the first sensor part, and a second transparent electrode electrically insulated from the first transparent electrode, and including a second sensor part formed in a second direction crossing the first direction and a second electrode connection part for electric connection of the second sensor part. The second electrode connection part has a mesh shape. The touch panel according to
(Continued)

(a)

(b)

another embodiment includes a substrate, a transparent electrode base spaced apart from the substrate, and a transparent electrode on the transparent electrode base. The transparent electrode comprises a first electrode including a first sensor part formed in one direction and a first electrode connection part for electrical connection of the first sensor part; and a second electrode, which is electrically insulated from the first electrode, and includes a second sensor part formed in a second direction crossing the first direction and a second electrode connection part for electrical connection of the second sensor part. The second electrode connection part has a mesh shape.

23 Claims, 5 Drawing Sheets

(58) Field of Classification Search
USPC .................................................. 345/173–179
See application file for complete search history.

(56) References Cited

U.S. PATENT DOCUMENTS

| | | | |
|---|---|---|---|
| 2009/0160824 A1 | 6/2009 | Chih-Yung et al. | |
| 2009/0194344 A1 | 8/2009 | Harley et al. | |
| 2009/0219257 A1 | 9/2009 | Frey et al. | |
| 2009/0219258 A1 | 9/2009 | Geaghan et al. | |
| 2009/0236151 A1* | 9/2009 | Yeh et al. | 178/18.03 |
| 2009/0244021 A1 | 10/2009 | Matsuo et al. | |
| 2009/0244028 A1* | 10/2009 | Matsuo | G06F 3/044 345/174 |
| 2010/0045625 A1* | 2/2010 | Yang | G06F 3/044 345/173 |
| 2010/0123674 A1* | 5/2010 | Wu et al. | 345/173 |
| 2010/0171718 A1 | 7/2010 | Denda | |
| 2010/0182250 A1* | 7/2010 | Kang | G06F 3/0416 345/173 |
| 2010/0182272 A1 | 7/2010 | Kang et al. | |
| 2010/0233930 A1 | 9/2010 | Ishida et al. | |
| 2010/0265207 A1* | 10/2010 | Chen | 345/174 |
| 2010/0283757 A1 | 11/2010 | Wu et al. | |
| 2010/0300862 A1* | 12/2010 | Tamura | G06F 3/0412 200/600 |
| 2010/0302201 A1 | 12/2010 | Ritter et al. | |
| 2010/0309164 A1 | 12/2010 | Yeh et al. | |
| 2011/0102370 A1 | 5/2011 | Kono et al. | |
| 2011/0157086 A1 | 6/2011 | Ozeki et al. | |
| 2011/0210935 A1* | 9/2011 | Chuang | G06F 3/0412 345/174 |
| 2011/0216018 A1* | 9/2011 | Kim et al. | 345/173 |
| 2011/0310033 A1* | 12/2011 | Liu | G06F 3/044 345/173 |
| 2012/0132511 A1 | 5/2012 | Tanaka et al. | |

FOREIGN PATENT DOCUMENTS

| | | |
|---|---|---|
| CN | 201343500 Y | 11/2009 |
| CN | 101713834 A | 5/2010 |
| EP | 2209064 A1 | 7/2010 |
| JP | 2009-230735 A | 10/2009 |
| JP | 2010160670 A | 7/2010 |
| JP | 2010211702 A | 9/2010 |
| JP | 2010-231533 A | 10/2010 |
| JP | 2010277354 A | 12/2010 |
| KR | 10-2009-0003261 A | 1/2009 |
| KR | 10-2009-0102663 A | 9/2009 |
| KR | 10-2010-0095886 A | 9/2010 |
| TW | 201040818 A | 11/2010 |
| WO | WO-2010013679 A1 | 2/2010 |
| WO | WO-2010029979 A1 | 3/2010 |

OTHER PUBLICATIONS

Notice of Allowance dated Aug. 30, 2012 in Korean Application No. 10-2011-0005612, filed Jan. 19, 2011.
Office Action dated Nov. 17, 2015 in Japanese Application No. 2013-550397.
European Search Report dated Jan. 4, 2016 in European Application No. 12736294.5.
Lee, J. et al (2008). Solution-Processed Metal Nanowire Mesh Transparent Electrodes. *Nano letters*, 8(2), 689-692.
Office Action dated Jul. 29, 2015 in Chinese Application No. 201280012889.4.
Office Action dated Sep. 23, 2016 in Chinese Application No. 201280012889.4.

* cited by examiner

[Fig. 1]
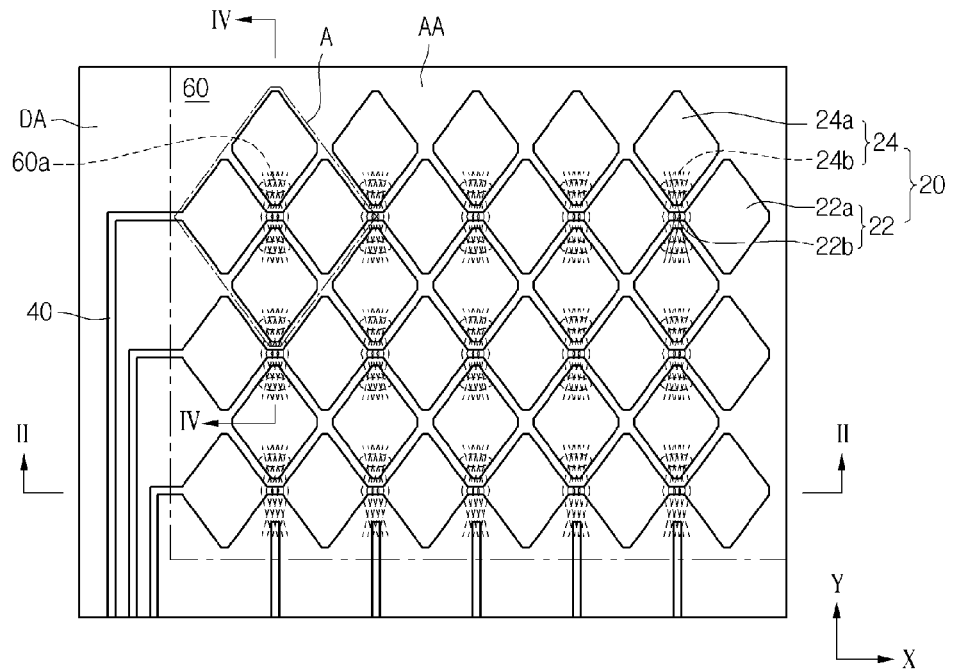
[Fig. 2]
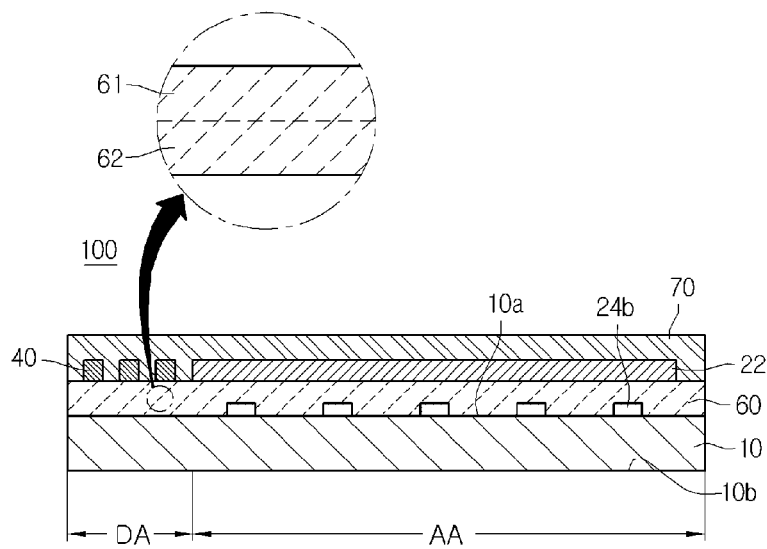
[Fig. 3]
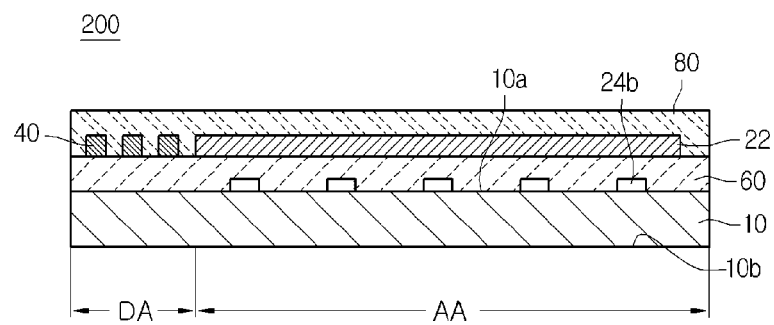

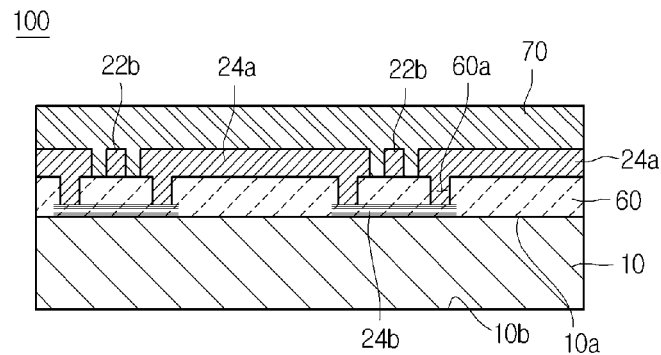
[Fig. 4]
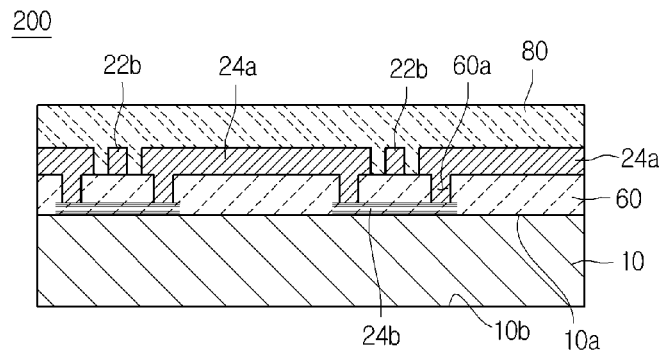
[Fig. 5]
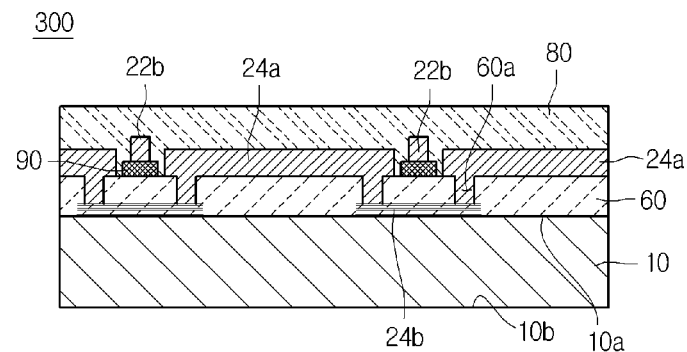
[Fig. 6]

[Fig. 7]
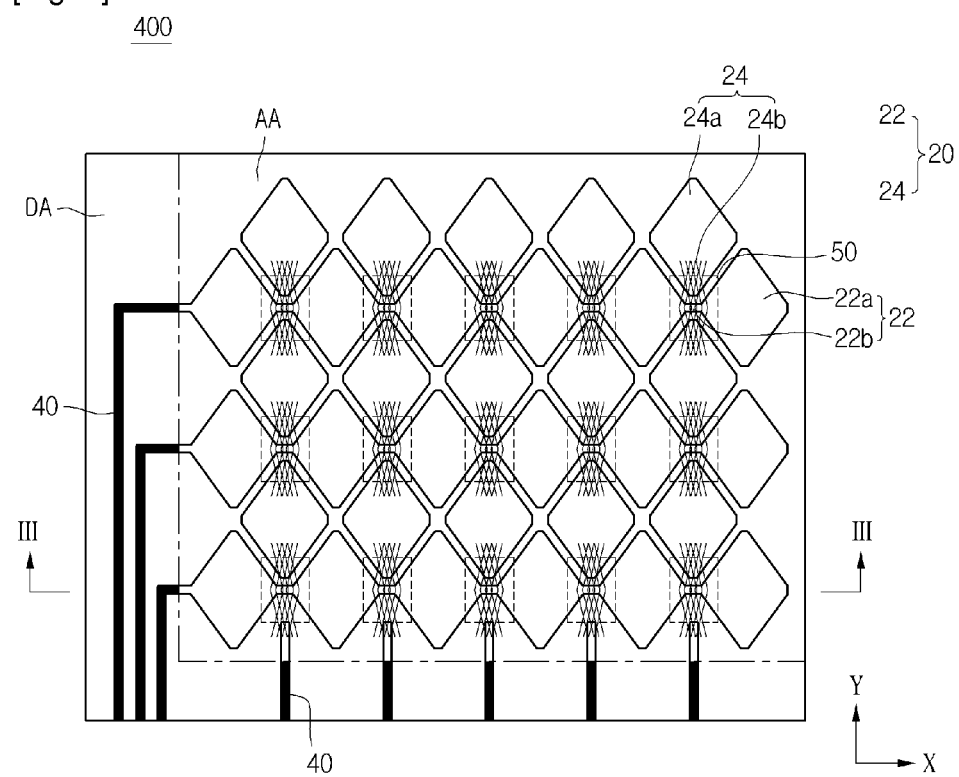
[Fig. 8]
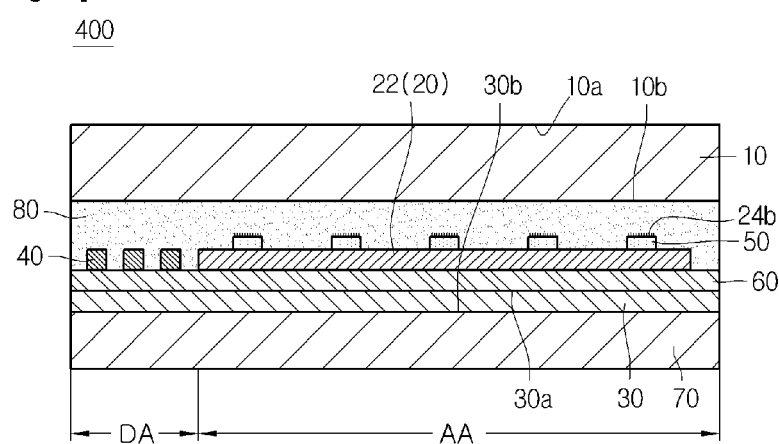

[Fig. 9]
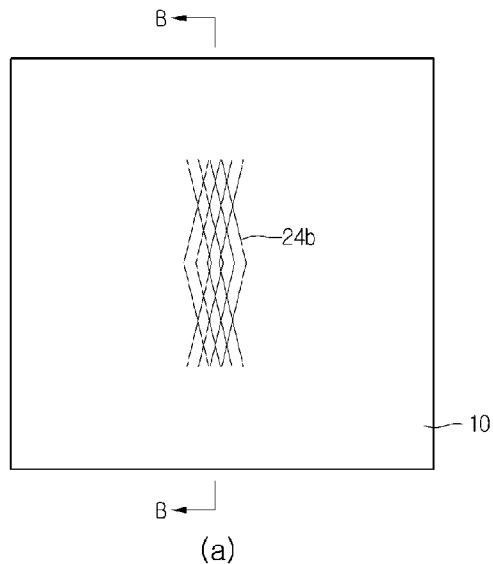
(a)
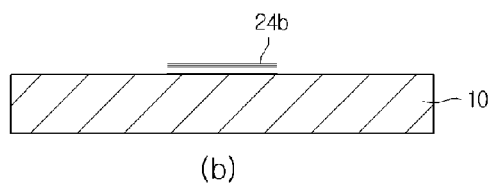
(b)
[Fig. 10]
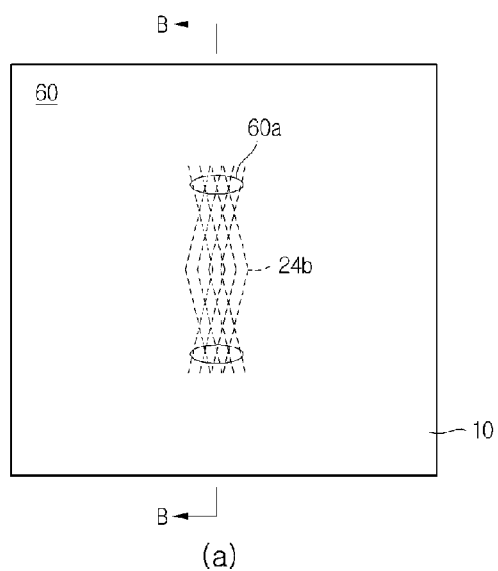
(a)
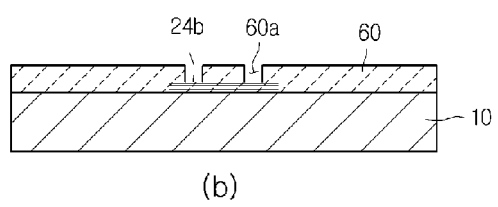
(b)

[Fig. 11]
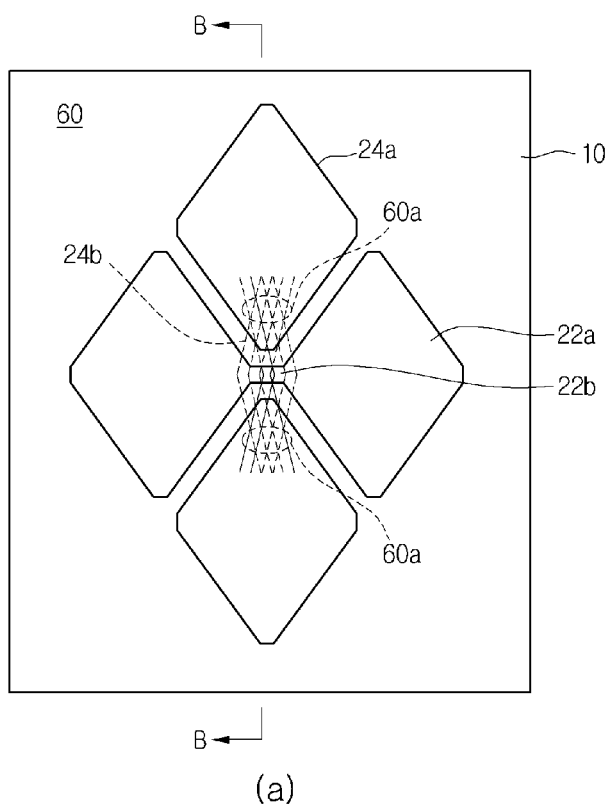
(a)
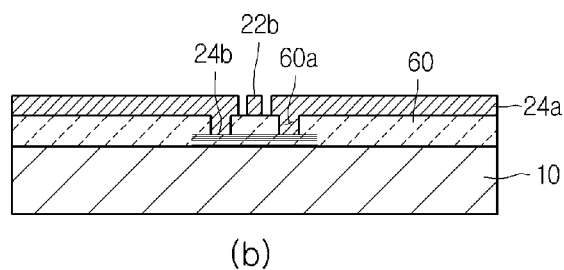
(b)

TOUCH PANEL AND METHOD FOR MANUFACTURING THE SAME

CROSS-REFERENCE TO RELATED APPLICATIONS

This application is the U.S. national stage application of International Patent Application No. PCT/KR2012/000439, filed Jan. 18, 2012, which claims priority to Korean Application Nos. 10-2011-0005611, filed Jan. 19, 2011, and 10-2011-0005612, filed Jan. 19, 2011, the disclosures of each of which are incorporated herein by reference in their entirety.

TECHNICAL FIELD

The disclosure relates to a touch panel and a method for manufacturing the same.

BACKGROUND ART

Recently, a touch panel, which performs an input function through the touch of an image displayed on a display device by an input device such as a stylus pen or a hand, has been applied to various electronic appliances.

The touch panel may be mainly classified into a resistive touch panel and a capacitive touch panel. In the resistive touch panel, glass is shorted with an electrode due to the pressure of the input device so that a touch point is detected. In the capacitive touch panel, the variation in capacitance between electrodes is detected when a finger of the user is touched on the capacitive touch panel, so that the touch point is detected.

One-layer touch panel employing a bridge electrode to reduce the thickness and improve the optical characteristic in the touch panel has been spotlighted. However, the pattern of connection electrodes may be recognized according to the size of the connection electrodes in an effective region.

DISCLOSURE OF INVENTION

Technical Problem

The embodiment provides a touch panel and a method for manufacturing the same, capable of improving the reliability and the characteristic.

Solution to Problem

According to the embodiment, there is provided a touch panel including a substrate, a first transparent electrode including a first sensor part formed on the substrate in a first direction and a first electrode connection part for electric connection of the first sensor part, and a second transparent electrode electrically insulated from the first transparent electrode, and including a second sensor part formed in a second direction crossing the first direction and a second electrode connection part for electric connection of the second sensor part. The second electrode connection part has a mesh shape.

According to the embodiment, there is provided a touch panel including a substrate, a transparent electrode base spaced apart from the substrate, and a transparent electrode on the transparent electrode base. The transparent electrode comprises a first electrode including a first sensor part formed in one direction and a first electrode connection part for electrical connection of the first sensor part; and a second electrode, which is electrically insulated from the first electrode, and includes a second sensor part formed in a second direction crossing the first direction and a second electrode connection part for electrical connection of the second sensor part. The second electrode connection part has a mesh shape.

According to the embodiment, there is provided a method for manufacturing a touch panel including preparing a substrate, forming a second electrode connection part in a mesh shape on the substrate, and forming a first sensor part, a second sensor part, and a first electrode connection part electrically insulated from the second electrode connection part on the second electrode connection part by using a transparent conductive material.

Advantageous Effects of Invention

According to the touch panel of the embodiment, connection electrodes are formed in a mesh shape, so that the pattern of the connection electrodes is not recognized in the effective region.

Meanwhile, in the touch panel according to the embodiment, the intermediate layer enabling index matching is interposed between the substrate and the transparent electrode, so that the characteristics such as the transmittance, the reflectance, and the chrominance (b*, yellowish) can be improved, and the transparent electrode can be directly formed on the intermediate layer. Therefore, the transmittance can be improved and the manufacturing cost can be reduced. In addition, the transparent electrode including a transparent conductive material can be in the invisible state through index matching. Therefore, the visibility of the display employing the touch panel can be improved.

According to the method for manufacturing the touch panel of the embodiment, the touch panel having the above effects can be manufactured.

BRIEF DESCRIPTION OF DRAWINGS

FIG. 1 is a plan view showing a touch panel according to a first embodiment;

FIG. 2 is a sectional view taken along line II-II of FIG. 1;

FIG. 3 is a plan view showing a touch panel according to a second embodiment;

FIG. 4 is a sectional view taken along line IV-IV of FIG. 1;

FIG. 5 is a sectional view showing the touch panel according to the second embodiment;

FIG. 6 is a sectional view showing a touch panel according to a third embodiment;

FIG. 7 is a plan view showing a touch panel according to a fourth embodiment;

FIG. 8 is a sectional view taken along line III-III of FIG. 7; and

FIGS. 9 to 11 are plan views and sectional views showing the method for manufacturing the touch panel.

MODE FOR THE INVENTION

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer shown in the drawings may be exaggerated, omitted or schematically drawn for the purpose of convenience or clarity. In addition, the size of elements does not utterly reflect an actual size.

Hereinafter, the embodiment of the disclosure will be described in detail with reference to accompanying drawings.

Hereinafter, a touch panel according to the embodiment will be described in detail with reference to FIGS. 1 to 5. FIG. 1 is a plan view showing the touch panel according to a first embodiment, and FIG. 2 is a sectional view taken along line II-II of FIG. 1. FIG. 3 is a sectional view showing a touch panel according to a second embodiment, and FIG. 4 is a sectional view taken along line IV-IV of FIG. 4. FIG. 5 is a sectional view showing the touch panel according to the second embodiment.

Referring to FIGS. 1 and 2, the touch panel according to the embodiment has an effective region AA, in which the position of an input device is detected, and a dummy region DA, which is positioned at an outer portion of the effective region AA, defined therein.

In this case, the effective region AA may be provided therein with a transparent electrode 20 to detect the input device. In addition, the dummy region DA may be provided therein with an interconnection 40 connected to the transparent electrode 20 and a printed circuit board (not shown) connecting the interconnection 40 to an external circuit (not shown). Hereinafter, the touch panel will be described in more detail.

Referring to FIG. 2, the touch panel 100 according to the first embodiment includes a substrate 10 including a first surface 10a and a second surface 10b, which are opposite to each other, an intermediate layer 60 formed on the first surface 10a of the substrate 10, a transparent electrode (20 of FIG. 1), and an anti-reflective layer 70.

The substrate 10 may include various materials to support the intermediate layer 60 and the transparent electrode 20 formed thereon. The substrate 10 may include a glass substrate or a plastic substrate.

The first surface (hereinafter, top surface) 10a of the substrate 10 is provided thereon with the transparent electrode 20.

The transparent electrode 20 may include first and second electrodes 22 and 24. The first electrode 22 includes a first sensor part 22a and a first electrode connection part 22b, and the second electrode 24 includes a second sensor part 24a and a second electrode connection part 24b.

If the input device such as a finger is touched on the touch panel, the difference in capacitance is made in a touched portion by the input device, and the touched portion having the difference in capacitance may be detected as a touch point.

In detail, the first electrode 22 includes the first sensor part 22a to detect the touch of the input device such as a finger and the first electrode connection part 22b connecting the first sensor part 22a. The first sensor part 22a may be formed in a first direction (X axis direction in accompanying drawings, the same in the following description), and the first electrode connection part 22b connects first sensor parts 22a to each other in the first direction. The first electrode connection part 22b may be integrally formed with the first sensor part 22a.

Similarly, the second electrode 24 includes the second sensor part 24a to detect the touch of the input device such as a finger and the second electrode connection part 24b connecting the second sensor part 24a. The second sensor part 24a to detect the touch of the input device such as a finger may be formed in a second direction (Y axis direction in accompanying drawings) crossing the first direction, and the second electrode connection part 24b connects second sensor parts 24a to each other in the second direction. The detail of the second electrode connection part 24b will be described in detail later.

Although the accompanying drawings show that the first and second sensor parts 22a and 24a have a diamond shape, the embodiment is not limited thereto. Accordingly, the first and second sensor parts 22a and 24a may have various shapes to detect the touch of the input device such as a finger. For example, the first and second sensor parts 22a and 24a may have a polygonal shape such as a rectangular shape or a pentagonal shape, a circular shape, or an oval shape.

The first sensor part 22a, the first electrode connection part 22b, and the second sensor part 24a may include a transparent conductive material allowing light transmission and the flow of electricity. In detail, the first sensor part 22a, the first electrode connection part 22b, and the second sensor part 24a may include materials such as indium tin oxide, indium zinc oxide, CNT (carbon nano-tube), conductive polymer, and Ag nano-wire ink.

Thereafter, the second electrode connection part 24b may have a mesh shape to connect second sensor parts 24a to each other.

The line width of the second electrode connection part 24b may be in the range of about 1 nm to about 5 μm. The second electrode connection part 24b having a line width of 1 nm or less cannot be formed due to the process characteristics. If the second electrode connection part 24b has a line width of more than 5 μm, the mesh shape of the second electrode connection part 24b may be recognized by eyes of a person. Accordingly, if the second electrode connection part 24b has the line width in the above range, since the second electrode connection part 24b is not recognized by the eyes of the person, the second electrode connection part 24b may have various shapes.

The second electrode part 24b may include metal representing superior electrical conductivity. For example, the second electrode part 24b may include chrome (Cr), nickel (Ni), copper (Cu), aluminum (Al), silver (Ag), molybdenum (Mo), or the alloy thereof.

However, the embodiment is not limited thereto. The second electrode connection part 24b may include a transparent conductive material. For example, the second electrode connection part 24b may include one of indium tin oxide, indium zinc oxide, carbon nano-tube (CNT), conductive polymer, and Ag nano-wire ink.

In addition, the mesh shape may be formed in a single layer or multiple layers. The flexibility or the adhesion is varied according to materials constituting the second electrode connection part 24b. Accordingly, if the mesh shape is formed in multiple layers, more advantageous characteristics can be represented.

The intermediate layer 60 having a contact hole 60a may be formed on the second electrode connection part 24b.

The intermediate layer 60 may include metal oxide or metal fluoride. For example, the intermediate layer 60 may include magnesium fluoride, silicon oxide, aluminum oxide, cerium fluoride, indium oxide, hafnium oxide, zirconium oxide, lead oxide, titanium oxide, tantalum oxide, or niobium oxide. The intermediate layer 60 has a specific refractive index, so that index matching can be achieved.

The intermediate layer 60 may be formed in a single layer or multiple layers so that the intermediate layer 60 may have a specific refractive index. For example, the intermediate layer 60 includes a first layer 61 having a high refractive index and a second layer 62 having a low refractive index, which are sequentially formed on the substrate 10, so that the light transmittance of the touch panel can be improved in the effective region AA.

For example, the first layer 61 may include tantalum oxide, titanium oxide, niobium oxide, zirconium oxide, or lead oxide, and the second layer 62 may include silicon oxide representing a high refractive index, and the second layer 62 may include silicon oxide representing a low refractive index. For example, the refractive index of the titanium oxide may be 2.2, the refractive index of the niobium oxide may be 2.4, and the refractive index of the silicon oxide may be 1.4. In this case, the transmittance of the touch panel can be improved to at least 90%, preferably, at least 92%. In addition, the transmittance of the touch panel can be improved at most 99%. In addition, a plurality of first layers 61 and a plurality of second layers 62 are alternately stacked on each other.

Meanwhile, the interconnection 40 connected to the transparent electrode 20 and the printed circuit board connected to the interconnection 40 are formed in the dummy region DA of the substrate 10. Since the interconnection 40 is positioned in the dummy region DA, the interconnection 40 may include metal representing superior electrical conductivity. The printed circuit board may include various printed circuit boards. For example, the printed circuit board may include the FPCB (flexible printed circuit board).

Referring to FIGS. 2 and 4, the anti-reflective layer 70 may be formed on at least one of the second surface (hereinafter, bottom surface) 10b of the substrate 10 and the second transparent electrode 20. Although the accompanying drawing shows that the anti-reflective layer 70 is formed on the transparent electrode 20, the embodiment is not limited thereto. Therefore, the anti-reflective layer 70 may be formed only on the bottom surface 10b of the substrate 10, or may be formed on both of the bottom surface 10b and the transparent electrode 20 of the substrate 10 in order to maximize the effects of the anti-reflective layer 70.

The anti-reflective layer 70 lowers the reflectance of a visible light in order to prevent the glare caused by the reflection or prevent a phenomenon in which a screen image is not viewed. In other words, the anti-reflective layer 70 can provide superior resolution by effectively reducing a bad influence caused by the reflection and can improve visibility. In addition, the transmittance of the touch panel can be improved to at least 90%, preferably, at least 92%. In addition, the transmittance of the touch panel can be improved at most 99%.

The anti-reflective layer 70 may include oxide or a fluoride having a refractive index of about 1.35 to about 2.7. The refractive index range is determined suitably for the anti-reflection. The anti-reflective layer 70 may be formed by stacking materials representing different refractive indexes in one or more layers.

The oxide or fluoride may include magnesium fluoride, silicon oxide, aluminum oxide, cerium fluoride, indium oxide, hafnium oxide, zirconium oxide, lead oxide, titanium oxide, tantalum oxide, or niobium oxide.

In this case, the anti-reflective layer 70 may be formed through a sputtering process or a roll-to-roll process. According to the sputtering process, ionized atoms are accelerated by an electric field and collide with a source material for a thin film. The atoms of the source material for the thin film are deposited due to the collision. According to the roll-to-roll process, after winding a paper or a film around a roll, the paper or the film is processed in the winding state around the roll.

Referring to FIGS. 3 and 5, a touch panel 200 according to the second embodiment may include a protective layer 80 formed on the transparent electrode 20. The protective layer 80 may protect the transparent electrode 20 from being damaged.

The protective layer 80 may include titanium oxide, niobium oxide, tantalum oxide, zirconium oxide, or lead oxide representing a high refractive index. The protective layer 80 having the high refractive index has a stack structure of multiple layers so that the transmittance can be more improved. In addition, the protective layer 80 may include a hard coating layer, so that the protective layer 80 can be prevented from being scratched.

Hereinafter, a touch panel 300 according to a third embodiment will be described with referenced to FIG. 6. FIG. 6 is a sectional view showing the touch panel according to the third embodiment.

In the touch panel 300 according to the third embodiment, a transparent insulating layer 90 may be additionally formed on the intermediate layer 60 to insulate the first electrode connection part 22b from the second electrode connection part 24b.

In the touch panels 100 and 200 according to the first and second embodiments described above, the first electrode connection part 22b can be insulated from the second electrode connection part 24b through the intermediate layer 60. However, in the touch panel 300 according to the third embodiment, the transparent insulating layer 90 is additionally formed on the intermediate layer 60, so that the characteristic to prevent electrical short can be more improved.

The transparent insulating layer 90 may include magnesium fluoride, silicon oxide, aluminum oxide, cerium fluoride, indium oxide, hafnium oxide, zirconium oxide, lead oxide, titanium oxide, tantalum oxide, or niobium oxide.

In addition, although not shown in accompanying drawings, only the transparent insulating layer 90 may be partially formed on the second electrode connection part 24b. The first electrode connection part 22b may be electrically insulated from the second electrode connection part 24b through the transparent insulating layer 90.

Hereinafter, a touch panel according to a fourth embodiment will be described with reference to FIGS. 7 and 8.

FIG. 7 is a plan view showing the touch panel according to the fourth embodiment, and FIG. 8 is a sectional view taken along line III-III of FIG. 7.

The touch panel 400 according to the fourth embodiment includes the substrate 10 including the first surface 10a (hereinafter, top surface) and the second surface 10b (hereinafter, bottom surface), which are provided in opposition to each other, a transparent electrode base 30 which is spaced apart from the bottom surface 10b of the substrate 10, and the transparent electrode 20 formed on the transparent electrode base 30. In addition, the anti-reflective layer 70 may be formed on the transparent electrode base 30.

The substrate 10 may include a glass substrate or a plastic substrate.

An OCA (optically clear adhesive) may be provided on the substrate 10 so that the substrate 10 is bonded to the transparent electrode base 30 to be described later.

The transparent electrode base 30 is spaced apart from the substrate 10. The transparent electrode base 30 may include glass or PET (poly (ethylene terephthalate))

The intermediate layer 60 is formed on the transparent electrode base 30. In detail, the intermediate layer 60 is formed on a third surface 30a of the transparent electrode base 30 which faces the substrate 10. The intermediate layer 60 may be formed on the whole surface of the third surface 30a.

Thereafter, the transparent electrode 20 is formed on the intermediate layer 60. The transparent electrode 20 may include first and second electrodes 22 and 24. The first electrode 22 includes the first sensor part 22a and the first electrode connection part 22b, and the second electrode 24 includes the second sensor part 24a and the second electrode connection part 24b.

Next, the second electrode connection part 24b connects second sensor parts 24a to each other. The second electrode connection part 24b has a mesh shape. The line width of the second electrode connection part 24b may be in the range of about 1 nm to about 5 μm.

A transparent insulating layer 50 is formed to prevent the first electrode connection part 22b from being shorted with the second electrode connection part 24b. In detail, the transparent insulating layer 50 may include transparent insulating material to insulate the first electrode connection part 22b from the second electrode connection part 24b.

Meanwhile, the anti-reflective layer 70 may be formed on at least one of the top surface 10a of the substrate 10 and a fourth surface 30b of the transparent electrode base 30. Although FIG. 8 shows that the anti-reflective layer 70 is formed on the fourth surface 30b of the transparent electrode base 30, the embodiment is not limited thereto. Therefore, the anti-reflective layer 70 may be formed only on the top surface 10a of the substrate 10, or may be formed on both of the top surface 10a of the substrate 10 and the fourth surface 30b of the transparent electrode base 30 in order to maximize the effects of the anti-reflective layer 70.

Hereinafter, a method for manufacturing the touch panel according to the embodiment will be described in detail with reference to FIGS. 9 to 11. In the following description, the details of structures and components the same as those described above or extremely similar to those described above will be omitted except for only structures and components making the difference from those described above for the purpose of clear and simple explanation.

FIGS. 9 to 11 are plan views and sectional views showing the method for manufacturing the touch panel. In this case, FIGS. 9(a) and 11(a) are plan views based on the region A of FIG. 1, and FIGS. 9(b) and 11(b) are sectional views taken along line B-B of FIGS. 9(a) and 11(a), respectively.

First, referring to FIG. 9, the second electrode connection part 24b is formed in the mesh shape on the substrate 10.

In order to form the second electrode connection part 24b in the mesh shape, after coating electrode material, the resultant structure may be etched through a photoresist process. Since the embodiment is not limited thereto, various processes to form the mesh shape may be used.

Thereafter, referring to FIG. 10, the intermediate layer 60 having the contact hole 60a is formed on the second electrode connection part 24b. In detail, the contact hole 60a may expose a portion of the second electrode connection part 24b, and allow the connection of the second sensor part (24a of FIG. 8) to be formed thereafter.

The intermediate layer 60 may be coated or deposited. For example, the intermediate layer 60 may be formed through a reactive sputtering process. In other words, oxygen gas ($O_2$) and/or nitrogen gas ($N_2$) are additionally applied into a sputtering device for a metal deposition source and a deposition target together with inert gas (Ar, or Ne), so that the metal deposition source is oxidized while the metal deposition source is being deposited on the deposition target.

Thereafter, referring to FIG. 11, the first sensor part 22a, the first electrode connection part 22b, and the second sensor part 24a are formed on the intermediate layer 60 by using transparent conductive materials. In this case, the second sensor part 24a is aligned in such a manner that the second sensor part 24a can be connected to the second electrode connection part 24b through the contact hole 60a.

The first sensor part 22a, the first electrode connection part 22b, and the second sensor part 24a may be formed through various thin film deposition schemes such as a PVD (Physical Vapor Deposition) scheme or a CVD (Chemical Vapor Deposition) scheme.

Although not shown in accompanying drawings, after the first sensor part 22a, the first electrode connection part 22b, and the second sensor part 24a have been formed, the anti-reflective layer or the protective layer may be additionally formed.

In addition, although not shown in accompanying drawings, a step of forming the transparent insulating layer (90 of FIG. 6) may be additionally performed between a step of forming the intermediate layer 60 and a step of forming the first sensor part 22a, the second sensor part 24a, and the first electrode connection part 22b.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

The invention claimed is:

1. A touch panel comprising:
    a substrate including a first surface and a second surface opposite to each other;
    a first transparent electrode including a first sensor part formed on the substrate in a first direction and a first electrode connection part for electric connection of the first sensor part on the first surface of the substrate;
    a second transparent electrode electrically insulated from the first transparent electrode, and including a second sensor part formed in a second direction crossing the first direction and a second electrode connection part for electric connection of the second sensor part on the first surface of the substrate;
    an interconnection connected to the first transparent electrode and the second transparent electrode on the first surface of the substrate; and an intermediate layer provided on the first surface of the substrate;

wherein the first sensor part, the first electrode connection part, the second sensor part, and the interconnection are disposed on the first surface of the substrate;

wherein the second electrode connection part has a mesh shape comprising a plurality of mesh lines;

wherein the second electrode connection part has a line width of the mesh lines in a range of 1 nm to 5 μm;

wherein the intermediate layer is disposed between the second electrode connection part and the first electrode connection part and formed on the first surface of the substrate, wherein the intermediate layer includes a first contact hole and a second contact hole to electrically connect the second sensor part with the second electrode connection part, wherein the second electrode connection part is disposed on the substrate, wherein the intermediate layer is disposed on the second electrode connection part, wherein the first electrode connection part is disposed on the intermediate layer, wherein the second electrode connection part has an extended width in a middle portion thereof, wherein the plurality of mesh lines comprise a first outermost mesh line and a second outermost mesh line that are spaced apart from each other, wherein the first outermost mesh line is disposed across the first contact hole and the second contact hole, wherein the first outermost mesh line and the second outermost mesh line are spaced apart from each other by a maximum distance at an intermediate point between the first contact hole and the second contact hole, and wherein the first outermost mesh line and the second outermost mesh line are spaced apart from each other by a second distance at a point closer to the first contact hole than to the intermediate point between the first contact hole and the second contact hole, the second distance being less than the maximum distance.

2. The touch panel of claim 1, further comprising a transparent insulating layer partially formed on the second electrode connection part.

3. The touch panel of claim 1, wherein at least a portion of the first transparent electrode is aligned on a same layer with at least a portion of the second transparent electrode.

4. The touch panel of claim 2, wherein the intermediate layer and the transparent insulating layer include at least one selected from the group consisting of magnesium fluoride, silicon oxide, aluminum oxide, cerium fluoride, indium oxide, hafnium oxide; zirconium oxide, lead oxide, titanium oxide, tantalum oxide, and niobium oxide.

5. The touch panel of claim 1, further comprising an anti-reflective layer formed on at least one of the second surface of the substrate, the first transparent electrode, and the second transparent electrode.

6. The touch panel of claim 5, wherein the anti-reflective layer includes at least one selected from the group consisting of magnesium fluoride, silicon oxide, aluminum oxide, cerium fluoride, indium oxide, hafnium oxide, zirconium oxide, lead oxide, titanium oxide, tantalum oxide, and niobium oxide.

7. The touch panel of claim 1, further comprising a protective layer formed on the first transparent electrode or the second transparent electrode.

8. The touch panel of claim 7, wherein the protective layer includes at least one selected from the group consisting of magnesium fluoride, silicon oxide, aluminum oxide, cerium fluoride, indium oxide, hafnium oxide, zirconium oxide, lead oxide, titanium oxide, tantalum oxide, and niobium oxide.

9. A touch panel comprising:
a substrate including a first surface and a second surface opposite to each other;
a transparent electrode base spaced apart from the second surface of the substrate, the transparent electrode base including a third surface and a fourth surface opposite to each other;
a transparent electrode on the transparent electrode base;
an interconnection connected to the transparent electrode; and
an intermediate layer disposed on the third surface of the transparent electrode base, wherein the transparent electrode is disposed between the second surface of the substrate and the third surface of the transparent electrode base, wherein the transparent electrode comprises a first electrode including a first sensor part formed in one direction and a first electrode connection part for electrical connection of the first sensor part; and a second electrode, which is electrically insulated from the first electrode, including a second sensor part formed in a second direction crossing the first direction and a second electrode connection part for electrical connection of the second sensor part;

wherein the second electrode connection part has a mesh shape including a plurality of mesh lines;

wherein the second electrode connection part has a line width of the mesh lines in a range of 1 nm to 5 μm, wherein the intermediate layer is disposed between the second electrode connection part and the first electrode connection part, wherein the intermediate layer includes a first contact hole and a second contact hole to electrically connect the second sensor part with the second electrode connection part, wherein the second electrode connection part is disposed on the substrate, wherein the intermediate layer is disposed on the second electrode connection part, wherein the first electrode connection part is disposed on the intermediate layer, and wherein the second electrode connection part has an extended width in a middle portion thereof, wherein the plurality of mesh lines comprise a first outermost mesh line and a second outermost mesh line that are spaced apart from each other, wherein the first outermost mesh line is disposed across the first contact hole and the second contact hole, wherein the first outermost mesh line and the second outermost mesh line are spaced apart from each other by a maximum distance at an intermediate point between the first contact hole and the second contact hole, and wherein the first outermost mesh line and the second outermost mesh line are spaced apart from each other by a second distance at a point closer to the first contact hole than to the intermediate point between the first contact hole and the second contact hole, the second distance being less than the maximum distance.

10. The touch panel of claim 1, wherein the second electrode connection part includes at least one selected from the group consisting of chrome (Cr), nickel (Ni), copper (Cu), aluminum (Al), silver (Ag), molybdenum (Mo), and alloys thereof.

11. The touch panel of claim 1, wherein the mesh shape is formed in at least one layer.

12. The touch panel of claim 1, wherein the intermediate layer includes at least one layer.

13. The touch panel of claim 1, wherein the first sensor part, the second sensor part, the first electrode connection part, the second electrode connection part, and the interconnection are disposed on a same layer of the substrate.

14. The touch panel of claim 9, wherein the second electrode connection part includes at least one selected from the group consisting of chrome (Cr), nickel (Ni), copper (Cu), aluminum (Al), silver (Ag), molybdenum (Mo), and alloys thereof.

15. The touch panel of claim 9, wherein at least a portion of the first electrode is aligned on a same layer with at least a portion of the second electrode.

16. The touch panel of claim 9, wherein the mesh shape is formed in at least one layer.

17. The touch panel of claim 9, wherein the intermediate layer includes at least one layer.

18. The touch panel of claim 9, wherein the first sensor part, the second sensor part, the first electrode connection part, the second electrode connection part and the interconnection are disposed on a same layer of the transparent electrode base.

19. The touch panel of claim 9, wherein an OCA (optically clear adhesive) is disposed between the substrate and the transparent electrode base.

20. The touch panel of claim 1, wherein the maximum distance between the first outermost mesh line and the second outermost mesh line is greater than a length of the first electrode connection part.

21. The touch panel of claim 1, wherein one end of the first outermost mesh line is adjacent to the first contact hole, and the other end of the first outermost mesh line is adjacent to the second contact hole;

wherein a first portion of the first outermost mesh line across the first contact hole and a second portion of the first outermost mesh line across the second contact hole extend in different directions from each other, and wherein a first portion of the second outermost mesh line across the first contact hole and a second portion of the second outermost mesh line across the second contact hole extend in different directions from each other.

22. The touch panel of claim 9, wherein the maximum distance between the first outermost mesh line and the second outermost mesh line is greater than a length of the first electrode connection part.

23. The touch panel of claim 9, wherein one end of the first outermost mesh line is adjacent to the first contact hole, and the other end of the first outermost mesh line is adjacent to the second contact hole;

wherein a first portion of the first outermost mesh line across the first contact hole and a second portion of the first outermost mesh line across the second contact hole extend in different directions from each other, and wherein a first portion of the second outermost mesh line across the first contact hole and a second portion of the second outermost mesh line across the second contact hole extend in different directions from each other.

* * * * *